(12) United States Patent
Tsai

(10) Patent No.: US 11,401,703 B1
(45) Date of Patent: Aug. 2, 2022

(54) HAND WASHING STATION FOR GALLEY MONUMENT

(71) Applicant: B/E Aerospace, Inc., Winston-Salem, NC (US)

(72) Inventor: Hsin-I Tsai, Newport Pagnell (GB)

(73) Assignee: B/E Aerospace, Inc., Winston-Salem, NC (US)

( * ) Notice: Subject to any disclaimer, the term of this patent is extended or adjusted under 35 U.S.C. 154(b) by 457 days.

(21) Appl. No.: 16/673,558

(22) Filed: Nov. 4, 2019

(51) Int. Cl.
*E03C 1/04* (2006.01)
*B64D 11/00* (2006.01)
*B64D 11/04* (2006.01)

(52) U.S. Cl.
CPC ............... *E03C 1/04* (2013.01); *B64D 11/00* (2013.01); *B64D 11/04* (2013.01); *B64D 2011/0046* (2013.01)

(58) Field of Classification Search
CPC ........... E03C 1/04; B64D 11/00; B64D 11/04; B64D 2011/0046; B67D 3/0003
USPC ............................................................ 4/623
See application file for complete search history.

(56) References Cited

U.S. PATENT DOCUMENTS

| | | | |
|---|---|---|---|
| 5,474,260 A | 12/1995 | Schwertfeger et al. | |
| 6,679,400 B1 * | 1/2004 | Goodman | B67D 1/16 222/108 |
| 7,406,722 B2 | 8/2008 | Fukuizumi et al. | |
| 8,519,824 B1 | 8/2013 | Rankin et al. | |
| 8,602,353 B2 | 12/2013 | Lindauer et al. | |
| 9,139,302 B2 | 9/2015 | Dehn et al. | |
| 9,210,911 B2 * | 12/2015 | Bernal | A01K 1/0114 |
| 9,506,696 B2 | 11/2016 | Seibt | |
| 9,976,336 B2 * | 5/2018 | Christenson | E05D 15/58 |
| 2007/0228216 A1 * | 10/2007 | Wenstrom | B64D 11/04 244/118.5 |
| 2009/0242075 A1 * | 10/2009 | Busick | C02F 1/325 141/85 |
| 2012/0180517 A1 * | 7/2012 | Filho | F25D 23/126 62/389 |
| 2013/0126536 A1 * | 5/2013 | Santy | B65D 1/34 220/571 |
| 2013/0160481 A1 * | 6/2013 | Hasturk | B65D 81/262 62/391 |
| 2014/0102553 A1 * | 4/2014 | Burd | E03B 1/042 137/315.01 |
| 2015/0266583 A1 | 9/2015 | Ehlers et al. | |

(Continued)

*Primary Examiner* — Benjamin R Shaw
(74) *Attorney, Agent, or Firm* — Suiter Swantz pc llo

(57) ABSTRACT

A galley structure incorporating a handwashing station is disclosed. The galley structure may be a monument having a lower portion adjacent to the galley floor and an upper portion above the lower portion. A compartment set into the upper portion includes an upper surface, sidewalls, and sink pan with drain at the bottom. A faucet is set into the upper surface, oriented downward and including an aerator for aerating or misting the stream of water (from an aircraft water supply) dispensed by the faucet. The faucet may be activated by a switch directly above the compartment so that a crewmember may wash their hands under the faucet. A perforated plate set above the sink pan prevents the water from splashing out of the sink pan. The interior of the handwashing station may also provide an extension of the adjacent workdeck surface when the faucet and sink are not in use.

10 Claims, 5 Drawing Sheets

(56) References Cited

U.S. PATENT DOCUMENTS

| | | | | |
|---|---|---|---|---|
| 2015/0275486 A1* | 10/2015 | Steward | ............... | B67D 1/0014 |
| | | | | 4/688 |
| 2015/0376881 A1 | 12/2015 | Moe | | |
| 2017/0341602 A1* | 11/2017 | Seibt | ........................ | A47K 1/04 |
| 2018/0112382 A1* | 4/2018 | Voetter | ...................... | E03C 1/14 |
| 2019/0335937 A1* | 11/2019 | Kelly | .................. | A47J 31/4407 |
| 2020/0002002 A1* | 1/2020 | Bauer | ................ | B64D 11/0015 |
| 2020/0141098 A1* | 5/2020 | Liu | ........................ | E03C 1/057 |
| 2020/0288899 A1* | 9/2020 | Abu-Saymeh | ........ | A47J 31/525 |
| 2020/0290860 A1* | 9/2020 | Lynch | ...................... | B67D 1/16 |
| 2020/0407954 A1* | 12/2020 | Grimaldi | .................. | E04H 1/12 |

\* cited by examiner

HAND WASHING STATION FOR GALLEY MONUMENT

TECHNICAL FIELD

Embodiments of the inventive concepts disclosed herein are directed generally to aircraft galley equipment, and more particularly to devices for dispensing non-potable water aboard an aircraft for sanitary purposes.

BACKGROUND

Cabin crew providing catering or in-seat food and beverage services to passengers aboard an aircraft must wash their hands frequently. If crewmembers are stationed at or near galley areas during service operations, then it would be most convenient for them to wash their hands there. However, most aircraft galleys do not incorporate sinks where non-potable water can be dispensed for handwashing and drained. Even if sinks were incorporated into galley structures, the more water a faucet requires the greater the water supply required to feed it, which adds weight and potential waste. Further, handwashing faucets may lead to splashing around the galley area, which in turn may present a hazard to crewmembers and must be cleaned up.

SUMMARY

An aircraft galley structure incorporating a handwashing station is disclosed. In embodiments, the galley structure includes a monument having a lower portion (e.g., adjacent to the galley floor) and an upper portion above the lower portion. The lower portion includes a compartment set into the galley structure and open to the passenger cabin; the compartment has an upper surface, sidewalls, and a sink pan at the bottom which drains to a wastewater tank or waste disposal system. A faucet (e.g., water outlet, spout) is set into the upper surface, oriented downward toward the sink pan and connected to an onboard water supply. The handwashing station includes an activation switch located directly above the compartment and configured for opening the valve between the water supply and the faucet, allowing the faucet to dispense a stream of water into the handwashing station when activated. Directly above the sink pan, a perforated plate is removably installed, the series of perforations through the plate preventing the stream of water from splashing out of the handwashing station. The faucet includes an aerator for converting the stream of water into an aerated stream or mist to conserve water and further reduce the risk of splashing.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
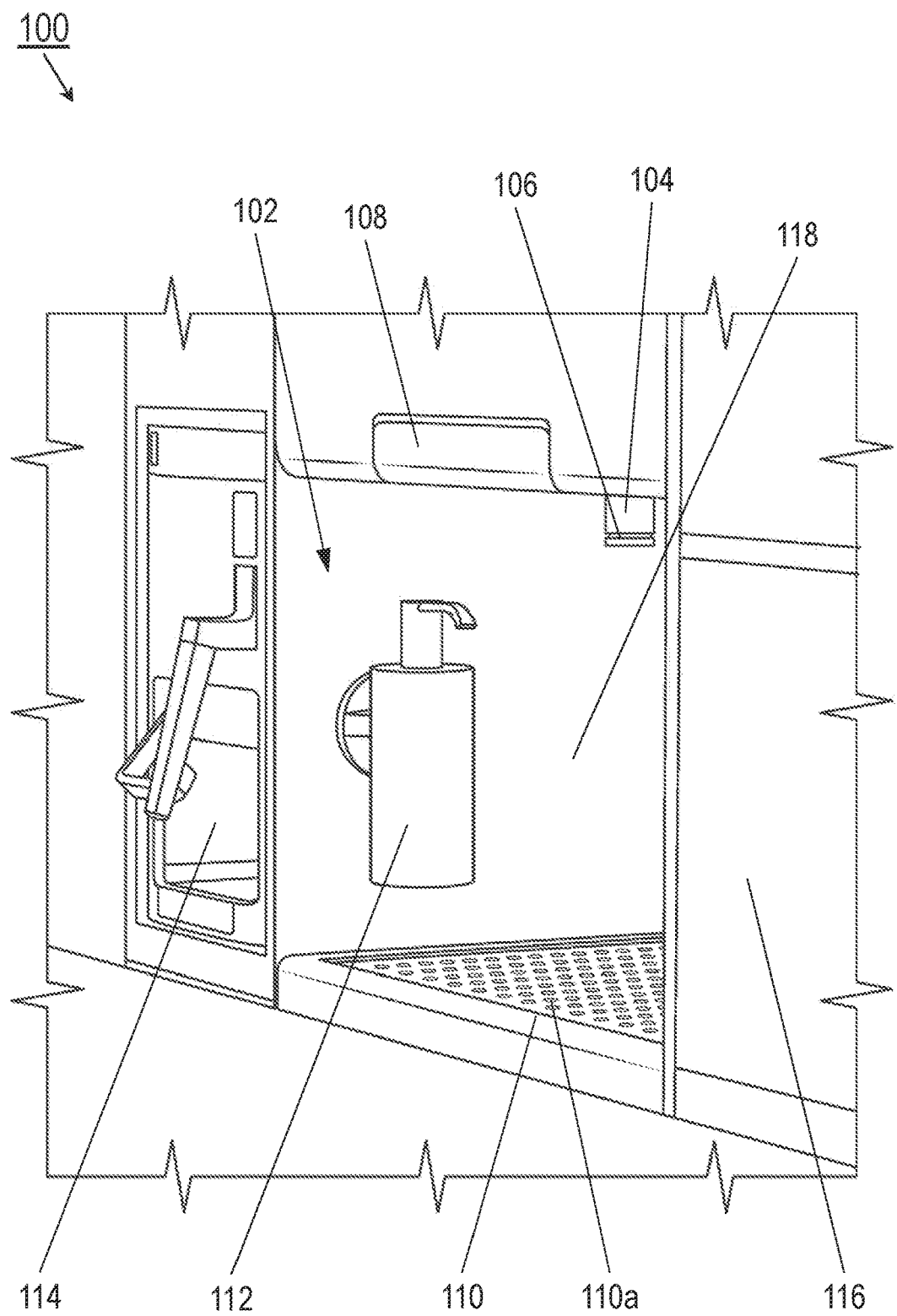
FIG. 1 is an isometric view illustrating a galley structure incorporating a handwashing station in accordance with example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Referring to FIG. 1, a galley structure 100 may include a handwashing station 102 incorporated within a compartment, the handwashing station including a faucet 104 (e.g., spout) with aerator 106, activation switch 108, perforated plate 110, and soap dispenser 112.

In embodiments, the galley structure 100 may be installed within the passenger cabin of an aircraft. For example, the galley structure 100 may comprise a pair of monuments sharing a common aisle between, or a single structure partially enclosing a work area where cabin crew may prepare meals and refreshments out of view of passengers. The galley structure 100 or its component monuments may include generally a lower portion adjacent to a floor of the passenger cabin. This lower portion may comprise a series of storage compartments or storage bays for galley carts (e.g., trolleys) of standard size; the galley carts may be stowed within the storage bays during taxi, takeoff and landing phases and removed from the storage bays once the aircraft has reached a safe cruising altitude and in-seat food and beverage service have commenced, the galley carts removed from their storage bays and transported along aisles in the passenger cabin via wheels or casters on their underside. The storage bays may further be connected to a chilled-air circulation system that forces chilled air over and around the exterior surfaces of each galley cart to maintain the galley carts at or below a desired temperature.

In embodiments, the handwashing station 102 may be disposed directly above the galley cart bays at approximately waist level. For example, the handwashing station 102 may be set into one or several adjacent compartments of the galley structure 100 of standard size. The galley structure 100 may include, adjacent to the handwashing station 102, a beverage maker 114 (e.g., capable of brewing or dispensing hot tea, hot coffee, or hot water) or a waste receptacle 116 (e.g., for used paper towels). In order to conserve space and reduce the risk of splashing, the faucet 104 may be set within the compartment, such that cabin crew may use the handwashing station 102 when one or both hands are within the compartment. The soap dispenser 112 may be mounted to a side wall of the compartment, e.g., the left side wall 118, for convenient use. For example, to use the handwashing station 102, a crewmember presses the activation switch 108, which actuates the opening of the valves connecting the faucet 104 to a water supply aboard the aircraft and enables the dispensing of water therethrough. For example, pressing the activation switch 108 may result in the timed dispensation of water through the faucet, e.g., for a predetermined number of seconds, before the valve closes. In some embodiments, the dispensation of water may continue while the activation switch 108 is pressed down.

In some embodiments, the faucet 104 may be connected to a water supply either within the galley structure 100 or elsewhere within the aircraft, e.g., a potable water tank configured to supply the beverage maker 114 and other water outlets. For example, the aerator 106 may be selectable or removable, such that the faucet 104 is rendered capable of dispensing potable water in a stream, e.g., into a cup or other receptacle placed into the handwashing station 102.

In embodiments, the faucet 104 may be angled substantially vertically, such that any water dispensed therefrom flows downward into a sink pan (not shown) and drains therefrom, e.g., into a waste storage tank or waste disposal system onboard the aircraft. The perforated plate 110 may have a substantially horizontal surface with numerous perforations (110a) through the plate, such that water flowing downward toward the perforated plate is partially or fully prevented from contacting the sink pan and deflecting therefrom, causing the water to splash in other directions. In some embodiments, the perforations 110a may form one or more patterns throughout the surface of the perforated plate 110; alternatively, the surface of the perforated plate 110 may partially or fully comprise a mesh extending across the plate, such that the perforations 110a are naturally formed thereby.

Figure 2A:
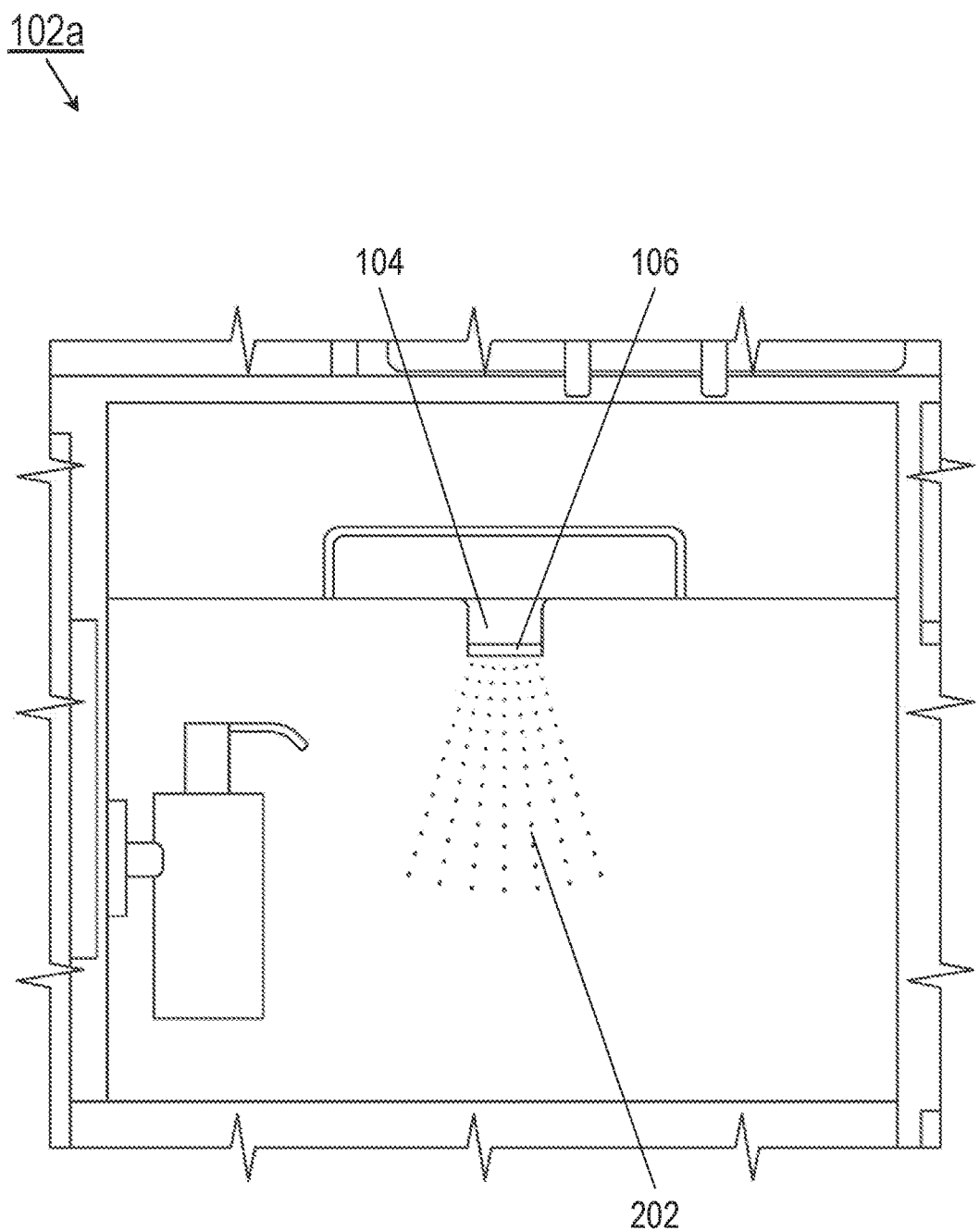
FIGS. 2A and 2B are respectively forward and left-side diagrammatic views illustrating the handwashing station of FIG. 1.
Figure 2B:
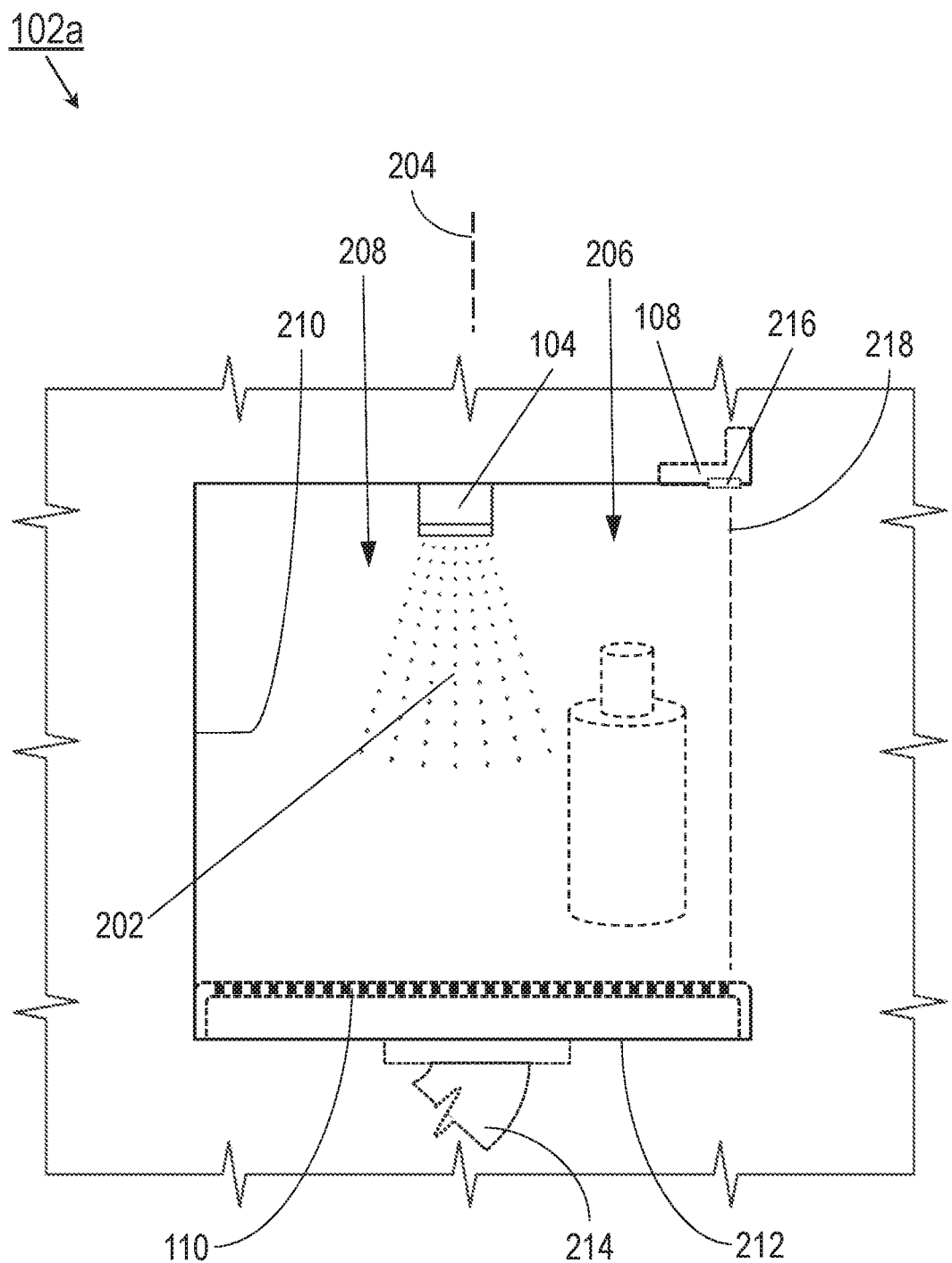

Referring to FIGS. 2A and 2B, the handwashing station 102a may be implemented and may function similarly to the handwashing station 102 of FIG. 1, except that with respect to the handwashing station 102a, the aerator 106 may convert the stream of water flowing through the faucet 104 into an aerated stream 202 or mist.

In embodiments, the aerated stream 202 may reduce the risk of splashing due to the stream of water contacting the user's hands or the perforated plate (110, FIG. 1). Further, the aerated stream 202 may more effectively distribute water over the user's hands while using a lower volume of water, thus conserving available water aboard the aircraft or conserving weight by reducing the volume of water carried aboard.

Referring in particular to FIG. 2B, the faucet 104 may be disposed within the handwashing station 102a partially or fully behind a line (204) dividing the handwashing station into a front portion 206 (e.g., a forward half of the compartment) and a rear portion 208 (e.g., a rear half of the compartment, adjacent to the rear wall 210 thereof). The positioning of the faucet 104 proximate to the rear wall 210 may further prevent water from escaping the handwashing station 102a.

In embodiments, the perforated plate 110 may be removably installed above the sink pan 212, such that the aerated stream 202 may fall through the perforated plate and into the sink pan, from where the water drains (214) to a waste water tank or waste disposal system aboard the aircraft. For example, the drain 214 may be set into the sink pan so as to align with the water flow from the faucet 104 in order to minimize splashing.

In some embodiments, the activation switch 108 may incorporate a sensor 216 (e.g., proximity sensor, motion sensor) configured to detect the user's hand within the handwashing station 102a. For example, if the user's hand breaks the plane 218, entering the handwashing station 102a, the faucet 104 may activate (e.g., the connecting valve may open), dispending the aerated stream 202 for a predetermined time (or, alternatively, as long as the user's hand remains within the handwashing station).

Figure 3A:
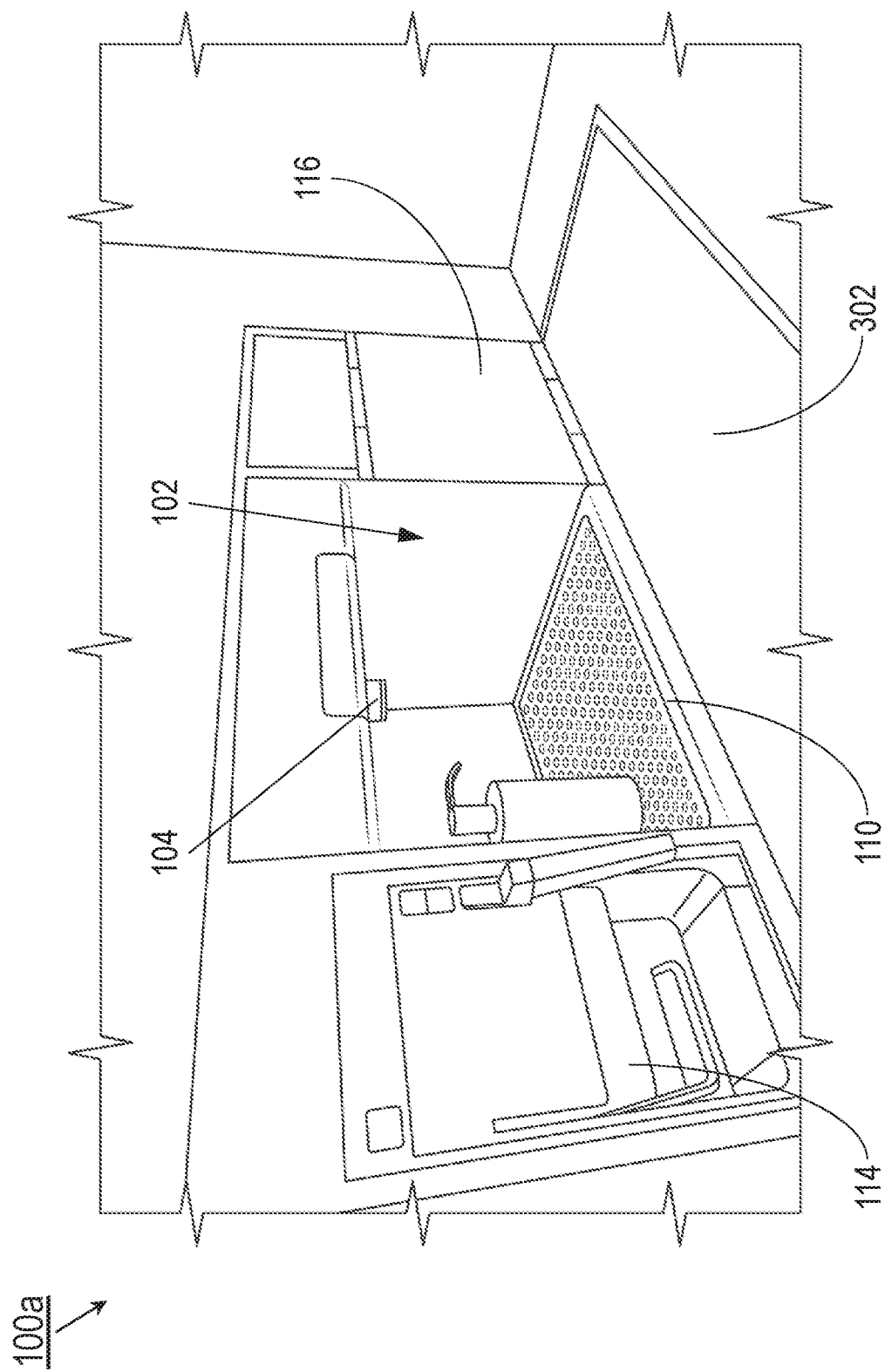
FIGS. 3A and 3B are isometric views illustrating the galley structure and handwashing station of FIG. 1.

Referring to FIG. 3A, the galley structure 100a may be implemented and may function similarly to the galley structure 100 of FIGS. 1 through 2B, except that the galley structure 100a may include a workdeck 302 directly in front of the handwashing station 102. In embodiments, the workdeck 302 may be disposed at approximately waist level (e.g., above the galley cart bays). For example, the workdecks 302 may provide cabin crew with a flat horizontal surface for food preparation. The positioning of the workdecks 302 may additionally prevent any water escaping the handwashing station 102 from reaching the floor of the galley area or passenger cabin; rather, any water may be easily wiped from the workdeck.

In some embodiments, the handwashing station 102 may fit into a galley standard unit (SU) compartment size space directly above the workdeck 302, e.g. adjacent to other similarly sized galley facilities or galley insert devices (e.g., beverage maker 114, waste receptable 116). For example, when the faucet 104 is not in use, the perforated plate 110 may provide an additional flat surface, e.g., for temporary storage or placement of pots or cups, extending the available surface of the adjacent workdeck 302.

Figure 3B:
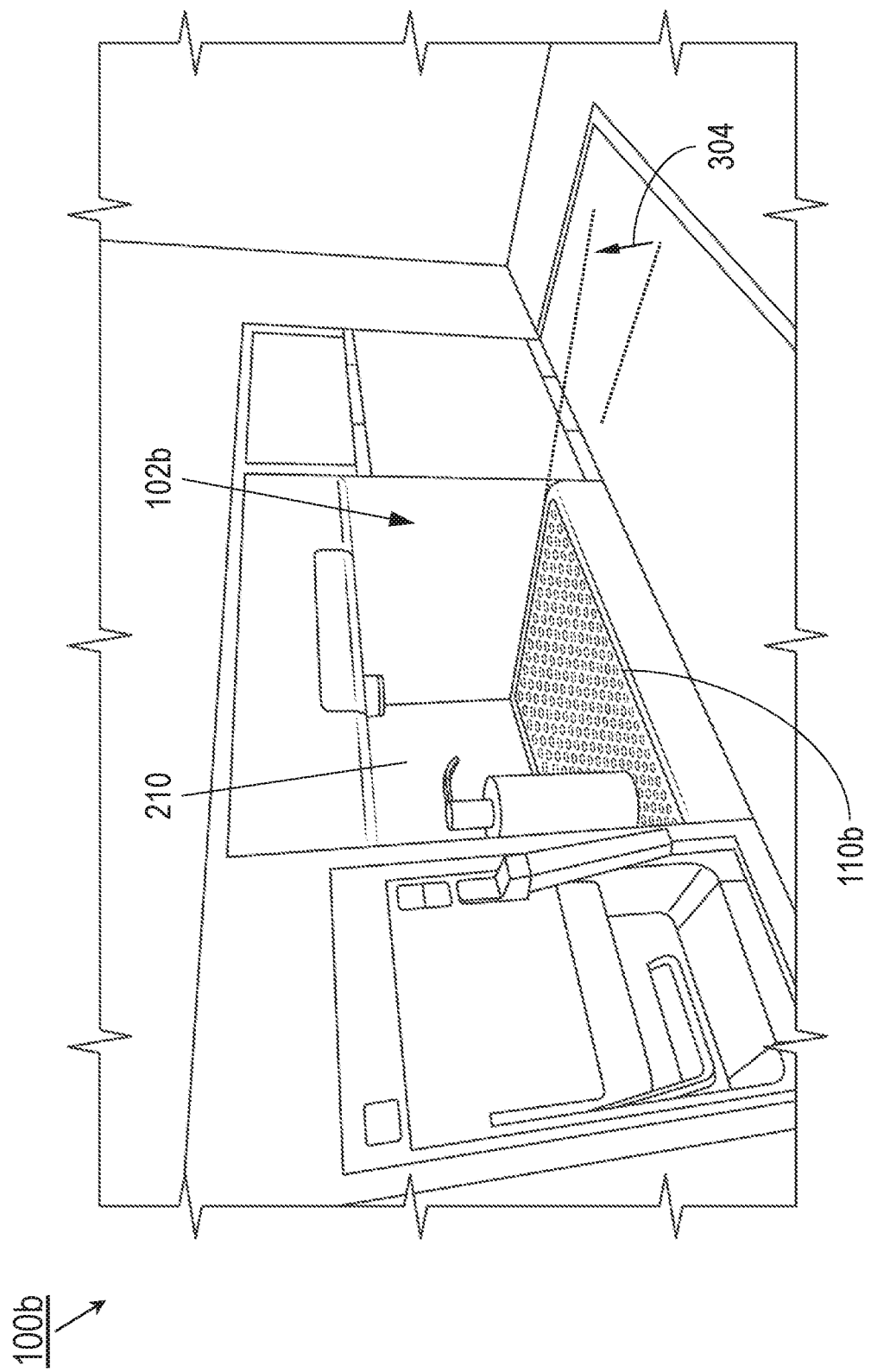

Referring in particular to FIG. 3B, the galley structure 100*b*, handwashing station 102*b*, and perforated plate 110*b* may be implemented and may function similarly to the galley structures 100, 100*a*, handwashing stations 102, 102*a* and perforated plate 110 of FIGS. 1 through 3A, except that the perforated plate 110*b* of the handwashing station 102*b* may be inclined (304) toward the rear wall 210 of the handwashing station, such that any water reflecting off the perforated plate 110*b* may be directed toward the rear wall and not outside the handwashing station.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

I claim:

1. A galley structure, comprising:
   a monument installable in a passenger cabin of an aircraft, the monument comprising a lower portion adjacent to a floor of the cabin and an upper portion disposed above the lower portion;
   at least one compartment set into the upper portion and open to the passenger cabin, the compartment comprising an upper surface, one or more walls, and a sink pan opposite the upper surface, the sink pan including at least one drain opening coupled to a drainage tank of the aircraft via a drain line;
   a water outlet set into the upper surface, the water outlet substantially oriented toward the sink pan and coupled to a water supply of the aircraft by at least one valve, the water outlet configured to dispense a stream of water into the compartment when activated;
   a perforated plate removably set above and proximate the sink pan and including a plurality of perforations therethrough;
   at least one activation switch disposed on an exterior surface of the monument adjacent to the upper surface, the activation switch operatively coupled to the water outlet and configured to open the valve when activated by a user;
   and
   at least one aerator disposed within the water outlet and configured to introduce air into the stream.

2. The galley structure of claim 1, wherein the perforated plate is substantially horizontal.

3. The galley structure of claim 1, wherein the one or more sidewalls include a left wall, a right wall, and a rear wall.

4. The galley structure of claim 3, wherein the water outlet is set into the upper surface proximate to the rear wall.

5. The galley structure of claim 3, wherein the perforated plate is tilted toward the rear wall.

6. The galley structure of claim 1, wherein the water supply includes a water tank disposed within the galley structure.

7. The galley structure of claim 1, further comprising:
   a substantially horizontal work surface disposed adjacent to the compartment.

8. The galley structure of claim 1, wherein the compartment is a first compartment, further comprising:
   at least one second compartment disposed within the upper portion and adjacent to the first compartment, the second compartment configured for housing a galley insert device.

9. The galley structure of claim 1, wherein the activation switch is configured to open the valve when articulated by a user.

10. The galley structure of claim 1, wherein the activation switch includes at least one proximity sensor configured to:
    detect a hand of the user within the compartment; and
    open the valve in response to the detection.

\* \* \* \* \*